United States Patent
Chen et al.

(10) Patent No.: US 7,310,724 B2
(45) Date of Patent: Dec. 18, 2007

(54) PARALLEL EXECUTION OF ENHANCED EFI BASED BIOS DRIVERS ON A MULTI-PROCESSOR OR HYPER-THREADING ENABLED PLATFORM

(75) Inventors: Lechong Chen, Shanghai (CN); Shaofan Li, Shanghai (CN); Xiang Ma, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 526 days.

(21) Appl. No.: 10/610,838

(22) Filed: Jun. 30, 2003

(65) Prior Publication Data

US 2004/0268108 A1 Dec. 30, 2004

(51) Int. Cl.
- G06F 9/00 (2006.01)
- G06F 9/24 (2006.01)
- G06F 15/177 (2006.01)

(52) U.S. Cl. ............... 713/1; 713/2; 713/100
(58) Field of Classification Search .......... 713/1, 713/2, 100
See application file for complete search history.

(56) References Cited

U.S. PATENT DOCUMENTS

| | | | |
|---|---|---|---|
| 5,544,316 A * | 8/1996 | Carpenter et al. | 719/310 |
| 5,745,763 A | 4/1998 | Mealey et al. | |
| 5,909,593 A * | 6/1999 | Abbondonzio et al. | 710/19 |
| 5,925,129 A * | 7/1999 | Combs et al. | 713/300 |
| 5,938,765 A * | 8/1999 | Dove et al. | 713/1 |
| 6,158,000 A * | 12/2000 | Collins | 713/1 |
| 6,216,216 B1 * | 4/2001 | Bonola | 712/28 |
| 6,336,185 B1 * | 1/2002 | Sargenti et al. | 713/2 |
| 6,374,353 B1 * | 4/2002 | Settsu et al. | 713/2 |
| 6,393,503 B2 * | 5/2002 | Fishler et al. | 710/100 |
| 6,816,963 B1 * | 11/2004 | Krithivas et al. | 713/1 |
| 6,868,507 B1 * | 3/2005 | Gurumoorthy et al. | 714/25 |
| 6,978,018 B2 * | 12/2005 | Zimmer | 380/30 |
| 2002/0169951 A1 | 11/2002 | Zimmer | |
| 2003/0009654 A1 * | 1/2003 | Nalawadi et al. | 713/1 |

OTHER PUBLICATIONS

Michael Kanellos, "Intel hopes new chip will spur sales", Nov. 14, 2002, CNET.com, available at http://news.com.com/intel+hopes+new+chip+will+spur+sales/2100-1001_3-965758. html, pp. 1-2.*
Intel Corp.: "Multiprocessor Specification 1.4" Intel Corporation Specifications, May 12, 1997.
Kinney M.: "Solving BIOS Boot Issues with EFI", Intel Developer Update Magazine, Sep. 2000, pp. 1-6.
H. Hsiung & D. Wei: "EFI Driver's Writers Guide", Feb. 19, 2003, URL: http://cnscenter.future.co.kr/resource/rsc-center/presentation/intel/spring 2003/S03USEFIS80_OS.pdf.
Anonymous, "Sharing Resources Between the Main and Coprocessor of a System", IBM Tech Discl. Bulletin, Jul. 1986, vol. 29, No. 2, p. 702.

* cited by examiner

*Primary Examiner*—Thomas Lee
*Assistant Examiner*—Ji H Bae
(74) *Attorney, Agent, or Firm*—Blakely, Sokoloff, Taylor & Zafman LLP

(57) ABSTRACT

Parallel execution of peripheral drivers on a multi-processor and/or hyper-threading enabled processor is described. According to one embodiment of the invention, two peripheral drivers are executed concurrently during a boot sequence. These peripheral drivers are executed on a first and a second processor. The processors may be logical or physical processors.

31 Claims, 4 Drawing Sheets

| 400 | | | | | | | |
|---|---|---|---|---|---|---|---|
| Processor 105 | BSP | Logical Processor 0 | PEI | DXE CORE | DXE CORE | (A,B) | BOOT OS |
| | AP | Logical Processor 1 | IDLE | CORE INITIALIZATION | | (C,D) | IDLE |
| Processor 110 | AP | Logical Processor 2 | IDLE | CORE INITIALIZATION | | (E,F) | IDLE |
| | AP | Logical Processor 3 | IDLE | CORE INITIALIZATION | | (G) | IDLE |

Figure 4

PARALLEL EXECUTION OF ENHANCED EFI BASED BIOS DRIVERS ON A MULTI-PROCESSOR OR HYPER-THREADING ENABLED PLATFORM

TECHNICAL FIELD

Embodiments of the invention relate to the field of computing; and, more specifically, to the parallel execution of BIOS drivers on a multi-processor or hyper-threading enabled platform.

BACKGROUND

The basic input/output system ("BIOS") is the part of the system software of a computing device (e.g., computer, personal digital assistant, etc.) that controls the operations of a boot sequence and provides the lowest level interface to peripheral devices. A boot sequence is the operations the computing device performs when it is powered on, including initializing peripheral devices (e.g., monitor display, keyboard, etc.), performing diagnostic tests, and loading an operating system or an equivalent thereof.

Typically, a single processor, known as a bootstrap processor, is designated to perform all of the operations of the boot sequence regardless of the number of processors (logical or physical) in the computing device. In a multiprocessor system, the other processor(s) (i.e., other than the bootstrap processor) typically remain idle during the entire boot sequence.

Furthermore, the amount of time for the boot sequence to complete may vary based on the computing device. For example, a typical BIOS operation to detect an Integrated Drive Electronic ("IDE") hard drive may be very time-consuming from time to time. This operation alone may take approximately thirty seconds to complete, which is a substantial amount of time when powering-up a computing device. In addition, each peripheral device is initiated in sequential order and one defective peripheral device driver may cause the entire boot sequence to fail.

Furthermore, the prior art boot environment presents significant challenges to innovation within the industry. Each new platform capability or hardware innovation requires firmware developers to craft increasingly complex solutions, and often requires operating system developers to make changes to their boot code before customers can benefit from the innovation. This can be a time-consuming process requiring a significant investment of resources.

BRIEF DESCRIPTION OF THE DRAWINGS

The invention may best be understood by referring to the following description and accompanying drawings that are used to illustrate embodiments of the invention. In the drawings:

FIG. 4 illustrates a chart showing the states of the dual processor system during the process flow to perform the boot sequence.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description.

Parallel execution of peripheral drivers on a multi-processor or hyper-threading enabled platform during a boot sequence is described. According to one embodiment, a BIOS groups and assigns the peripheral drivers of a computing device to multiple processors to be executed during the boot sequence. The multiple processors may be a combination of logical or physical processors, as will be described. In one embodiment, an enhanced extensible firmware interface ("EFI") based BIOS is used to group and assign the peripheral drivers to the multiple processors. The following description is described using a personal computer as an example of a computing device. However, it will be appreciated by those of ordinary skill in the art that embodiments of the invention may be practiced on an alternative device having a processor.

Figure 1:
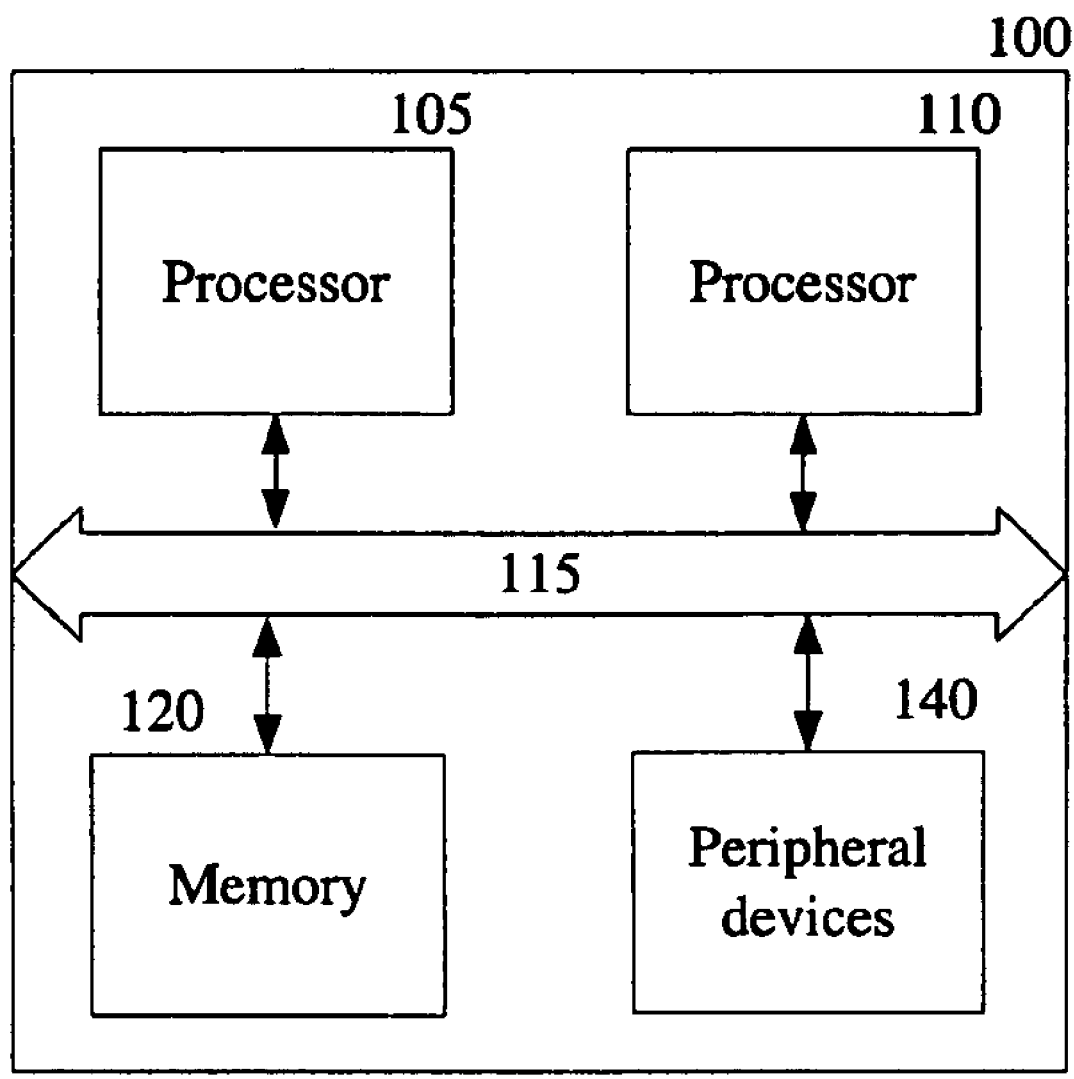
FIG. 1 illustrates an exemplary computer system according to one embodiment of the invention.

FIG. 1 is a block diagram illustrating one embodiment of a computer system 100 in accordance with one embodiment of the invention. The computer system 100 comprises a processor 105, a processor 110, and a memory 120, each coupled to a bus 115. The memory 120 is configured to store instructions, which, when executed by the processor 105 and/or processor 110, perform the methods described herein. In addition, a number of peripheral devices 140 are also coupled to the bus 115. The peripheral devices 140 may include a monitor display, a keyboard, a mouse, a hard drive, a CD-driver, a floppy drive, a network card, a fax-modem, and/or a television broadcast receiver, among other components well known to those of ordinary skill in the art.

The processor 105 and processor 110 represent a central processing unit of any type of architecture, such as CISC, RISC, VLIW, or hybrid architecture. The bus 115 represents one or more buses (e.g., System Bus, AGP, PCI, ISA, X-Bus, VESA, etc.) and bridges.

In one embodiment, the processor 105 and processor 110 enable the computer system 100 to perform multiprocessing. Multiprocessing improves performance in a computer system by allowing for the concurrent execution of an application program and/or an instruction on each processor. This includes multiple computer systems working on the same program at the same time (in parallel). Examples of multiprocessing architectures include a symmetrical multiprocessing ("SMP") architecture and a non-uniform memory access ("NUMA") architecture. Multiprocessing is well known to those of ordinary skill in the art, hence, a further description is omitted so as to not obscure the understanding of this description.

The computer system 100 may also include software, such as an application program, an operating system (not shown), and a BIOS.

Figure 2:
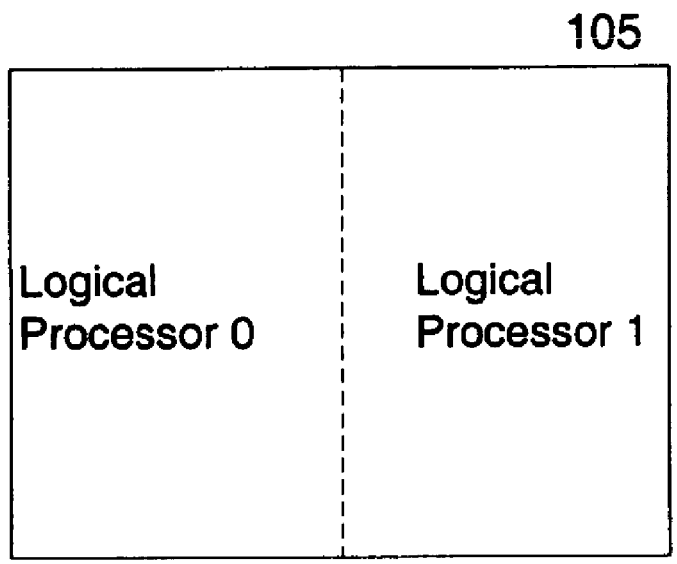
FIG. 2 illustrates one embodiment of dual processors having hyper-threading software.
Figure 2:
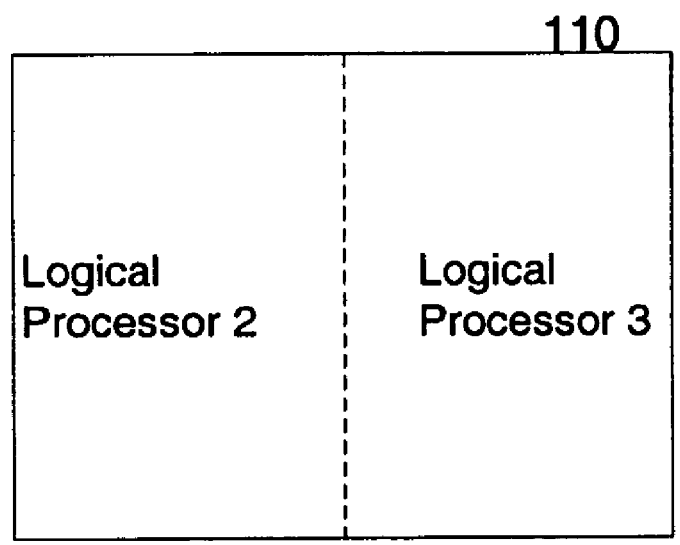

FIG. 2 illustrates one embodiment of processor 105 and processor 110 having hyper-threading software. Hyper-threading software enables processor 105 to include a logical processor 0 and a logical processor 1, and enables processor 110 to include a logical processor 2 and a logical processor 3. In this way, hyper-threading software is used by processor 105 and processor 110 in computer system 100 to allow each processor to appear to be two (or more) separate processors to the software.

In one embodiment, hyper-threading works by duplicating certain sections of each processor (e.g., those that store the architectural state), but not duplicating the main execution resources. With hyper-threading, a "physical" processor can execute two pieces of software (e.g., two threads or processes) in parallel sending by scheduling software (e.g., operating system). Having two or more streams of execution units to work on allows more work to be done by both processor 105 and processor 110 during each clock cycle. When execution resources in a non-hyper-threading capable processor would go idle because the piece of software running on that processor is stalled, a hyper-threading equipped processor may use those execution resources to execute other scheduled pieces of software. Reasons for the processors (105 and 110) to stall include waiting for resources to be available, deliberate stall, waiting for results of previous instructions before the current one can be executed, among other examples.

Because most of today's operating systems are capable of dividing their workload among multiple processors (e.g., SMP), the operating system simply acts as though the hyper-threading processor is a pool of two or more processors.

A hyper-threading equipped processor is a well-known technology to those of ordinary skill in the art and, accordingly, a more detailed description of the technology has been omitted so as to not obscure the understanding of the present invention.

Figure 3:
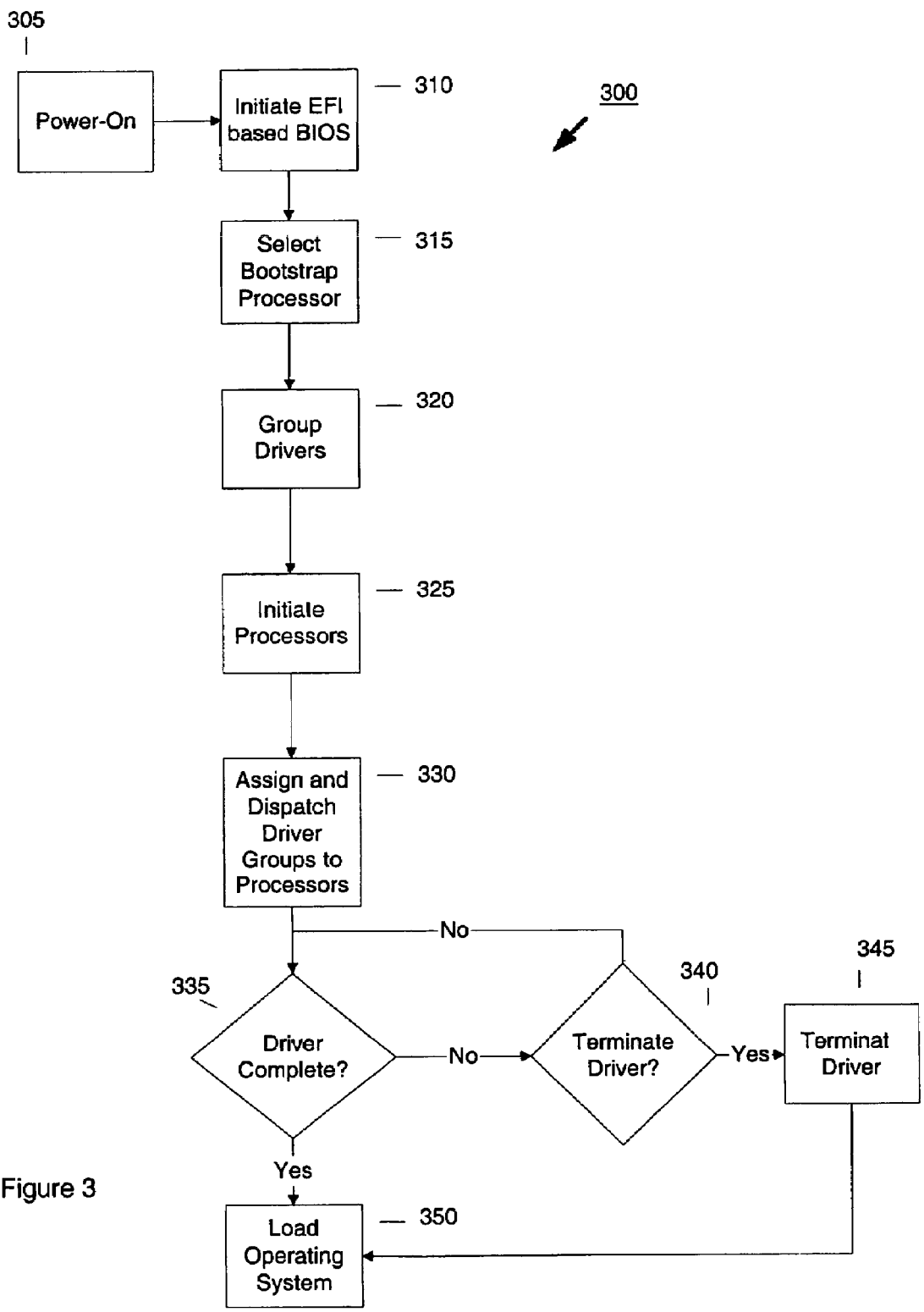
FIG. 3 illustrates one embodiment of a process flow to perform a boot sequence on a hyper-threading enabled dual processor computer system with an EFI based BIOS.

Current BIOS processing is only performed on one processor, typically known as the bootstrap processor, regardless of the number of processors (e.g., logical or physical processors) that are present in a prior art computer system. FIG. 3 illustrates one embodiment of a process flow (300) to perform a boot sequence on a hyper-threading enabled dual processor computer system (100) with an EFI based BIOS.

The EFI based BIOS includes an interface between the operating system and the platform firmware. The interface is in the form of data tables that contain platform-related information and boot and runtime service calls that are available to the operating system. Together, these provide a standard environment for booting the operating system.

The EFI specification is designed as a pure interface specification. As such, the specification defines the set of interfaces and structures that the peripheral devices (e.g., platform firmware) must implement. Similarly, the specification defines the set of interfaces and structures that the operating system may use in booting. How either a firmware developer chooses to implement the required elements or an operating system developer chooses to make use of those interfaces and structures is an implementation decision left for the developer.

Furthermore, the specification defines an open, extensible interface that lends itself to the creation of the peripheral drivers for providing support for new device types during the boot process, or to implement enhanced platform capabilities like fault tolerance or security. This ability to extend platform capability is designed into the specification from the outset. This is intended to help developers avoid many of the frustrations inherent in trying to squeeze new code into the prior art BIOS environment. As a result of the inclusion of interfaces to add new protocols, original equipment manufactures ("OEMs") or firmware developers have an infrastructure to add capability to the platform in a modular way. The drivers are implemented using high-level coding languages, which in turn help to reduce the difficulty and cost of innovation.

An enhanced EFI-based BIOS provides utilities to organize peripheral drivers into groups, as will be described. A peripheral driver includes software instructions to initialize and control one of the peripheral devices 140. Typically, a peripheral driver is responsible for accessing the hardware register of a peripheral device. Organizing peripheral drivers into groups allows specific peripheral drivers to be executed in a specific order, as will be described.

Referring to the process flow 300, at block 305 the computing device is powered on.

At block 310, the EFI based BIOS is automatically initiated. In one embodiment, the EFI based BIOS is enhanced to have a two-phase platform initialization. A Pre-EFI Initialization ("PEI") phase, followed by Driver Execution Environment ("DXE") phase. The PEI is responsible for initializing minimum system resources (e.g., memory) to enable the DXE. The DXE includes a DXE core and multiple peripheral drivers. The DXE core manages the collective execution of the various peripheral drivers to initialize the computer system 100 to the final pre-boot state (e.g., prior to the loading of the operating system), as will be described.

At block 315, the bootstrap processor is selected to perform the operations of the PEI and DXE core.

FIG. 4 illustrates a chart 400 showing the states of processor 105 and processor 110 during the process flow 300. Given processors (105, 110) are equipped with hyper-threading, the physical processor 105 is shown to include logical processor 0 and logical processor 1, and processor 110 is shown to include logical processor 2 and logical processor 3.

Referring back to block 315, the logical processor 0 is designated as the bootstrap processor responsible for processing PEI and DXE core while the other logical processors 1, 2, and 3, designated herein as the application processors ("AP"), are idle.

At block 320, the DXE core separates the peripheral drivers into driver groups. In one embodiment, the peripheral drivers may be grouped based on the number of logical processors in the computer system 100, the dependency of each peripheral driver, and the execution time for each peripheral driver. A goal of such groupings is to make driver groups independent and to balance the load of each driver group. It should be understood that other criteria well known to those of ordinary skill in the art may be used to determine how to order and group the peripheral drivers and that the invention is not limited to those disclosed herein.

In one embodiment, the DXE core builds a list of peripheral drivers to dispatch by enumerating the storage medium of drivers (e.g., the flash). The DXE core groups the peripheral drivers based on the peripheral driver dependency, so that for each group of peripheral drivers there is no dependency.

For example, given seven drivers to dispatch, such as Driver A, Driver B, Driver C, Driver D, Driver E, Driver F, and Driver G, the dependency between them can be noted as (A, B), (C, D), (E, F), (G), where (X, Y) means that driver Y has a dependency on driver X. Dependency meaning one driver must be executed after another driver is executed. Based on these dependencies and the number of processors, the DXE core splits the list into four groups. One possible split can be [A, B], [C, D], [E, F] and [G], where [X, Y, Z, etc.] means that driver X, Y, and Z are in the same group. It should be understood that in one embodiment there is no dependency between groups.

At block 325, the DXE core initializes each logical processor. FIG. 4 shows logical processor 1, logical processor 2, and logical processor 3 being initialized. The DXE core then makes all of the logical processors available to the DXE.

At block 330, the DXE core assigns and dispatches each group to a logical processor (e.g., logical processor 0, logical processor 1, logical processor 2, and logical processor 3). The DXE core dispatches these peripheral driver groups concurrently, where group [A, B] is dispatched to logical processor 0, group [C, D] is dispatched to logical processor 1, group [E, F] is dispatched to logical processor 2, and group [G] is dispatched to logical processor 3, as shown in FIG. 4. As shown, these four groups are executed concurrently as there is no dependency between them.

At block 335, a determination is made whether the processing of a driver group is complete. In one embodiment, the DXE core monitors the processing of each logical processor. This processing may include inquiring each logical processor for a dispatching result for each group until all are finished. If the logical processor has completed processing the group, control passes to block 350. If the logical processor has not completed processing the group, control passes to block 340.

At block 340, a determination is made whether to terminate an executing group. A group may need to be terminated if, for example, it is defective. Therefore, it may be beneficial to terminate a group after a predetermined amount of time, or after a predetermined number of machine cycles. The predetermined amount of time or the predetermined number of machine cycles is based on platform policy. It may vary between platforms. If it is determined to terminate the group, control passes to block 345. If it is determined not to terminate the group, control passes to block 335.

At block 345, the group is terminated. If a group is terminated, a specific driver in the group may be terminated or the group as a whole may be terminated.

At block 350, the operating system is loaded. FIG. 4 shows the designated bootstrap processor (e.g., logical processor 0) performing the loading of the OS.

While this embodiment is described in relation to a dual processor computer system, alternative embodiments of the computing system are not limited to two processors, but may be implemented with more than two processors. A multi-processor computer system may also be executed on more than one computer system. Alternatively, embodiments of the invention may also be implemented on a single processor computer system using a hyper-threading equipped processor.

In addition, instead of assigning and dispatching a group and/or driver to a specific logical processor, the group and/or driver may be assigned to a specific physical processor in a dual or multi-processor computing system that is not enabled with hyper-threading.

Furthermore, the invention is not limited to executing peripheral drivers from within a group and, alternatively, the peripheral drivers may be executed concurrently on multiple processors during a boot sequence without being placed within a group.

It should be appreciated that more or fewer processes may be incorporated into the method illustrated in FIG. 3 without departing from the scope of the invention and that no particular order is implied by the arrangement of blocks shown and described herein. It further will be appreciated that the embodiments of methods described in conjunction with FIG. 3 may be embodied in machine-executable instructions (e.g., software). The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-accessible medium having stored thereon instructions, which may be used to program a computer (or other electronic devices) to perform the methods. For the purposes of this specification, the terms "machine-accessible medium" shall be taken to include any medium that is capable of storing or encoding a sequence of instructions for execution by the machine and that cause the machine to perform any one of the methodologies of the present invention. The term "machine-accessible medium" shall accordingly be taken to include, but not be limited to, solid-state memories, optical and magnetic disks, and carrier wave signals. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result.

Thus, parallel execution of peripheral drivers on a multi-processor and/or hyper-threading enabled processor has been described. In today's BIOS, only the bootstrap processor is utilized during the boot sequence, while the other processor(s) are set to idle. It should be appreciated that introducing parallel execution of peripheral drivers utilizing multiple processors (e.g., combination of logical and physical) induces faster completion of the boot sequence. It should also be understood that with parallel execution of peripheral drivers, other peripheral drivers may be load balanced, and the stability for the computer system is enhanced, since it has the capability to terminate a defective peripheral driver so that one defective device driver does not cause failure of the boot sequence.

Furthermore, although the description describes using an enhanced EFI based BIOS, it should be understood that one of ordinary skill in the art might enhance another modular based BIOS to include the functionality of a PEI and a DXE for implementation on various platform and processor architectures.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A system comprising:
a first processor to execute a first peripheral driver in a first driver group; and
a second processor to execute a second peripheral driver in a second driver group, the second driver group being separated and independent from the first driver group, the first peripheral driver and the second peripheral driver being executed concurrently during a boot sequence;
wherein the peripheral drivers are extensible firmware interface ("EFI") based BIOS drivers.

2. The system of claim 1, wherein the first processor is a logical processor.

3. The system of claim 1, wherein the first processor is a physical processor.

4. The system of claim 1, wherein the first processor and the second processor are logical processors.

5. The system of claim 1, wherein the first processor and the second processor are physical processors.

6. The system of claim 1, wherein the first processor and the second processor are capable of terminating at least one of the peripheral drivers.

7. The system of claim 1, wherein the first driver group is initiated by the first processor.

8. The system of claim 1, wherein the second driver group is initiated by the second processor.

9. The system of claim 1 wherein at least one of the first processor and the second processor is equipped with hyper-threading.

10. A method comprising:
   separating a plurality of peripheral drivers into independent first and second driver groups; and
   executing a first peripheral driver in the first driver group and a second peripheral driver in the second driver group concurrently during a boot sequence on a first processor and a second processor, respectively;
   wherein the peripheral drivers are extensible firmware interface based BIOS drivers.

11. The method of claim 10, wherein the first processor is a logical processor.

12. The method of claim 10, wherein the first processor is a physical processor.

13. The method of claim 10, wherein the first processor and the second processor are logical processors.

14. The method of claim 10, wherein the first processor and the second processor are physical processors.

15. The method of claim 10 wherein executing comprises:
   executing the first and second driver groups concurrently on the first and second processors, respectively.

16. The method of claim 10, further comprising:
   terminating the execution of the first peripheral driver.

17. The method of claim 10 wherein at least one of the first processor and the second processor is equipped with hyper-threading.

18. A machine-accessible storage medium that provides instructions that, if executed by a machine, cause the machine to perform operations comprising:
   separating a plurality of peripheral drivers into independent first and second driver groups; and
   executing a first peripheral driver in the first driver group and a second peripheral driver in the second driver group concurrently during a boot sequence on a first processor and a second processor, respectively;
   wherein the peripheral drivers are extensible firmware interface based BIOS drivers.

19. The machine-accessible medium of claim 18, wherein the first processor is a logical processor.

20. The machine-accessible medium of claim 18, wherein the first processor is a physical processor.

21. The machine-accessible medium of claim 18, wherein the first processor and the second processor are logical processors.

22. The machine-accessible medium of claim 18, wherein the first processor and the second processor are physical processors.

23. The machine-accessible medium of claim 18, wherein the operations comprising executing comprises operations comprising:
   executing the first and second driver groups concurrently on the first and second processors, respectively.

24. The machine-accessible medium of claim 18, wherein the operations further comprises:
   terminating the execution of the first peripheral driver.

25. The machine-accessible medium of claim 18 wherein at least one of the first processor and the second processor is equipped with hyper-threading.

26. A system comprising:
   a memory; and
   a processor coupled to the memory via a bus, the processor including a bootstrap processor and a plurality of application processors (APs), the bootstrap processor separating a plurality of peripheral driver groups into independent peripheral driver groups and dispatching the independent peripheral driver groups to the APs, the APs executing the independent peripheral driver groups concurrently during a boot sequence;
   wherein the peripheral driver groups include extensible firmware interface EFI based BIOS drivers.

27. The system of claim 26, wherein the bootstrap processor monitors processing of each of the APs.

28. The system of claim 27, wherein one of the APs terminates executing if the corresponding independent peripheral driver group is defective.

29. The system of claim 26, wherein the bootstrap processor performs loading of an operating system when the APs complete processing the independent peripheral driver groups.

30. The system of claim 26, wherein each of the independent peripheral driver groups has no dependency on another independent peripheral driver group.

31. The system of claim 26 wherein at least one of the first processor and the second processor is equipped with hyper-threading.

* * * * *